United States Patent
Rashidi

(10) Patent No.: US 7,679,209 B2
(45) Date of Patent: Mar. 16, 2010

(54) WIND POWERED ELECTRICITY GENERATING SYSTEM

(75) Inventor: Majid Rashidi, Pepper Pike, OH (US)

(73) Assignee: Cleveland State University, Cleveland, OH (US)

( * ) Notice: Subject to any disclaimer, the term of this patent is extended or adjusted under 35 U.S.C. 154(b) by 306 days.

(21) Appl. No.: 11/775,315

(22) Filed: Jul. 10, 2007

(65) Prior Publication Data

US 2009/0015017 A1    Jan. 15, 2009

(51) Int. Cl.
*F03D 9/00* (2006.01)
*F03D 1/02* (2006.01)
(52) U.S. Cl. .......................................... 290/55; 415/60
(58) Field of Classification Search ................. 290/43, 290/44, 54, 55; 415/60, 71
See application file for complete search history.

(56) References Cited

U.S. PATENT DOCUMENTS

| | | | |
|---|---|---|---|
| 756,372 A | 4/1904 | Johnson | |
| 1,057,233 A | 3/1913 | DeGeofroy | |
| 1,876,595 A | 9/1932 | Beldimano | |
| 2,418,439 A | 4/1947 | Wetherill | |
| 3,726,476 A | 4/1973 | Porter et al. | |
| 3,944,839 A * | 3/1976 | Carter | 290/55 |
| 4,088,419 A | 5/1978 | Hope et al. | |
| 4,140,433 A | 2/1979 | Eckel | |
| 4,156,579 A | 5/1979 | Weisbrich | |
| 4,156,580 A | 5/1979 | Pohl | |
| 4,184,084 A * | 1/1980 | Crehore | 290/55 |
| 4,236,083 A | 11/1980 | Kenney | |
| 4,288,199 A | 9/1981 | Weisbrich | |
| 4,348,594 A | 9/1982 | Lipfert | |
| 4,421,452 A | 12/1983 | Rougemont | |
| 4,540,333 A | 9/1985 | Weisbrich | |
| 4,708,592 A | 11/1987 | Krolick et al. | |
| 4,725,194 A | 2/1988 | Bartsch | |
| 4,764,683 A * | 8/1988 | Coombes | 290/55 |
| 5,062,765 A * | 11/1991 | McConachy | 415/4.3 |
| 5,137,417 A | 8/1992 | Lund | |
| 5,313,103 A | 5/1994 | Hickey | |

(Continued)

FOREIGN PATENT DOCUMENTS

WO    WO 02/084115    10/2002

(Continued)

OTHER PUBLICATIONS

Eneco, "Wind Amplified Rotor Platforms", http://www.warp-eneco.com/warp.php, Accessed on the World Wide Web on Oct. 10, 2006, pp. 1-3.

(Continued)

*Primary Examiner*—Nicholas Ponomarenko
(74) *Attorney, Agent, or Firm*—Calfee, Halter & Griswold LLP

(57) ABSTRACT

An electrical energy generating system converts wind power to electrical power with a wind deflecting structure that divides wind impinging on the structure into two separate accelerated flow paths. One or more turbines are positioned in proximity to the wind deflecting structure such that a portion of the vanes of the turbine is placed within one of the accelerated flow paths. An energy converter is coupled to the turbine that converts rotary motion of the turbine into electricity.

12 Claims, 7 Drawing Sheets

U.S. PATENT DOCUMENTS

| | | | |
|---|---|---|---|
| 5,520,505 A * | 5/1996 | Weisbrich | 415/4.1 |
| 6,015,258 A | 1/2000 | Taylor | |
| 6,132,172 A | 10/2000 | Li | |
| 6,158,953 A | 12/2000 | Lamont | |
| 6,278,197 B1 | 8/2001 | Appa | |
| 6,519,901 B1 | 2/2003 | Nelson | |
| 6,626,638 B2 | 9/2003 | Rosefsky | |
| 6,966,747 B2 | 11/2005 | Taylor et al. | |
| 7,540,706 B2 * | 6/2009 | Rashidi | 415/60 |
| 2002/0180216 A1 | 12/2002 | McDavid | |
| 2006/0273597 A1 | 12/2006 | Rashidi | |
| 2008/0279690 A1 | 11/2008 | Rashidi | |

FOREIGN PATENT DOCUMENTS

| | | |
|---|---|---|
| WO | 2006/133122 | 12/2006 |

OTHER PUBLICATIONS

International Search Report from co-pending International Application No. PCT/US2006/021791, with an International Filing Date of Jun. 5, 2006; claiming benefit of U.S. Appl. No. 60/687,622, filed Jun. 3, 2005 entitled "Wind Harnessing System" (Applicant: Cleveland State University).

International Search Report and Written Opinion from PCT/US08/63151, mailed Aug. 7, 2008.

Alter, "Mag-Wind Vertical Axis Turbine for your Home", Science & Technology, Toronto, Jan. 22, 2007, http://www.treehugger.com/files/2007/01/magwind_vertica.php, printed Mar. 2, 2007.

Blevins, "Flow Induced Vibration", Figs. 3-21(a) and accompany text; Rao, SS, Mechanical Vibration 4th Ed., Figs. 3.30(a) and 3.30(b).

Office action from U.S. Appl. No. 11/445,663 mailed Apr. 4, 2008.

Amendment from U.S. Appl. No. 11/445,663 mailed Jul. 6, 2008.

Notice of Allowance from U.S. Appl. No. 11/445,663 mailed Sep. 23, 2008.

International Search Report and Written Opinion from PCT/US08/68888 mailed Sep. 3, 2008.

* cited by examiner

WIND POWERED ELECTRICITY GENERATING SYSTEM

BACKGROUND OF INVENTION

The present invention relates to devices for use in collecting wind energy. Harnessing energy through the collection of wind power is an attractive energy source when compared with other forms of energy collection. For example, energy collection through the burning of fossil fuels depletes limited natural resources and creates pollution. In contrast however, wind energy is a renewable power source and collecting it generates minimal pollution.

SUMMARY OF THE INVENTION

An electrical energy generating system converts wind power to electrical power with a wind deflecting structure that divides wind impinging on the structure into two separate accelerated flow paths. One or more vertical or horizontal axis turbines are positioned in proximity to the wind deflecting structure such that the turbine is placed within one of the accelerated flow paths. An energy converter is coupled to the turbine that converts rotary motion of the turbine into electricity.

DETAILED DESCRIPTION OF THE INVENTION

Figure 1:
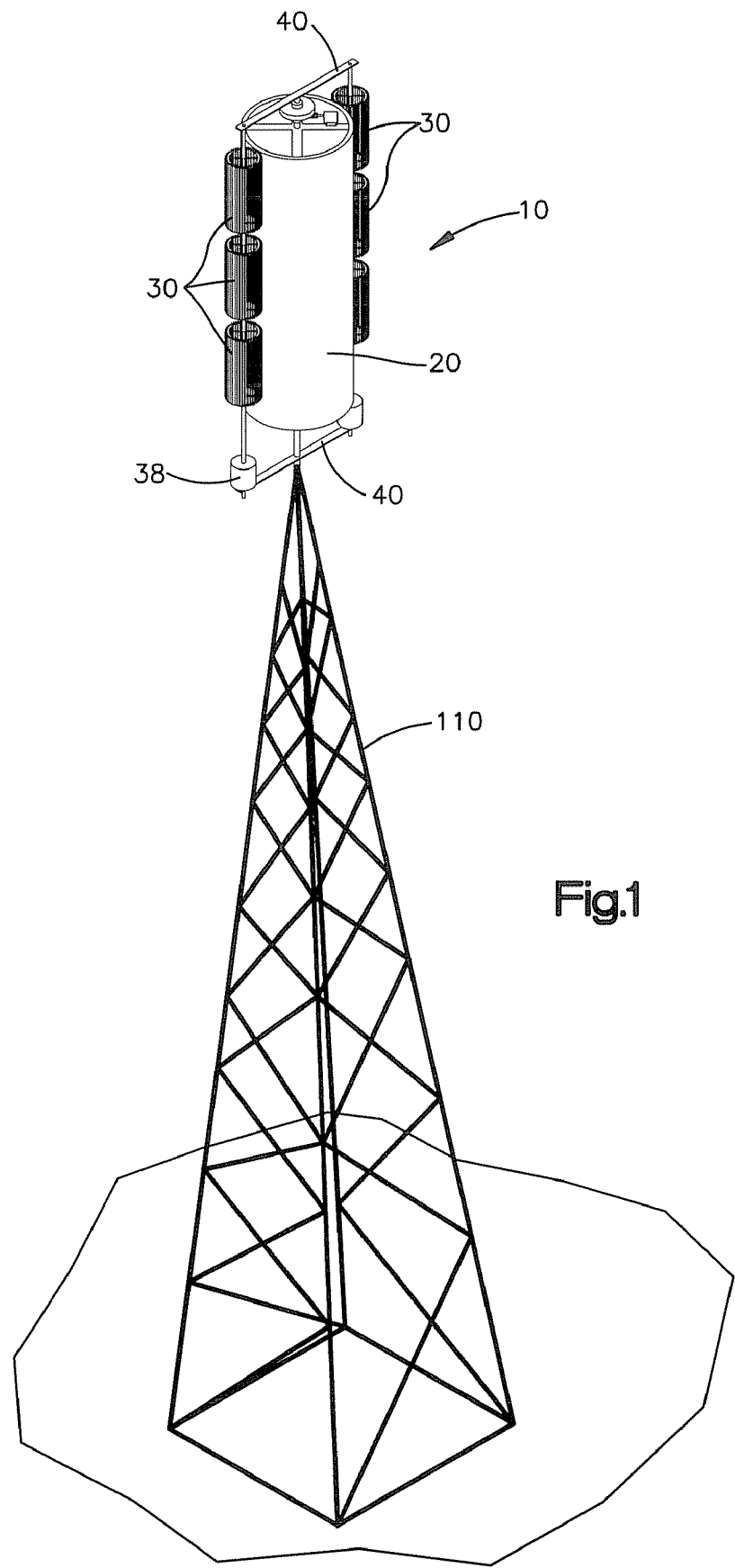
FIG. 1 is a perspective view of a wind powered electricity generating system constructed in accordance with an embodiment of the present invention that utilizes vertical axis turbines and is mounted to a tower.

For the purposes of this disclosure, "invention" and "inventive" refer to the legal invention defined by the combination of features recited in the attached claims in their final form (i.e. after completion of examination), with no additional features being added thereto. In contrast, "embodiment" refers to specific examples of this legal invention such as illustrated in the drawings and otherwise described in this disclosure.

FIG. 1 is a long range view of a wind powered electricity generating system 10 that is mounted to a tower 110 that is similar to a water tower. The wind powered electricity generating system 10 is elevated by the tower in this embodiment to take advantage of increased wind speed at greater distances from the ground. The wind powered electricity generating system 10 includes a wind deflecting structure 20 and one or more turbines 30. The turbines 30 shown in FIGS. 1-4 and 6 are vertical axis turbines, however, it is to be understood that horizontal axis turbines 30', as shown in FIG. 7 and described in more detail below, can be utilized in place of or in addition to the vertical axis turbines 30. The turbines 30 are mounted in close proximity to the wind deflecting structure 20 on a turbine mounting frame 40. The turbines are mounted in close proximity to the wind deflecting structure so that the turbines can be driven by one of two accelerated wind flow paths (FIG. 6) that are created in the region closely surrounding the wind deflecting structure.

The turbine mounting frame 40 may be stationary and oriented to position the turbines into the direction from which local prevailing winds most commonly originate. Alternatively, the turbine mounting frame may be moveable with respect to the wind deflecting structure to position the turbines into the wind. The turbines are mechanically coupled to one or more generators 38. Rotary motion of the turbines is used to drive the generators to generate electricity.

The wind deflecting structure 20 can be an existing generally cylindrical structure such as a silo or water storage tank on a water tower. In this case, the wind generating system 10 is constructed by retrofitting turbines and energy converters onto the existing cylindrical structure. Instead of being mounted on a tower 110, the wind powered electricity generating system 10 can be mounted on top of a tall building or other structure that positions the system at a sufficient height to benefit from increased wind velocities found at higher altitudes. The wind deflecting structure can be a dedicated construction as will be described below.

Figure 2:
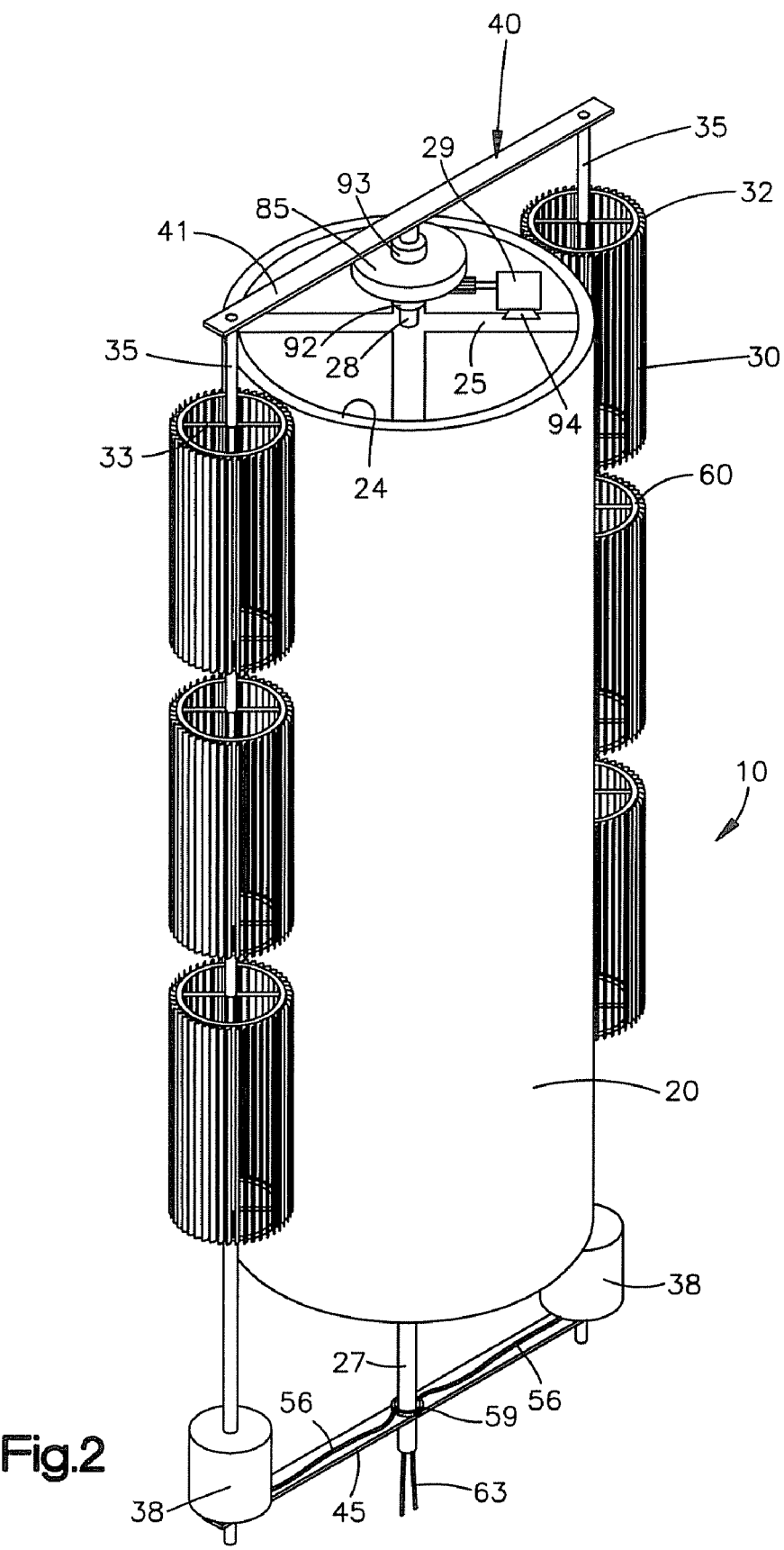
FIG. 2 is a perspective view of the wind powered electricity generating system of FIG. 1.

Referring now to FIG. 2, the wind powered electricity generating system 10 is shown in greater detail. The wind deflector 20 has a generally cylindrical shape that optimizes the acceleration affects of the deflector on wind that encounters the deflector. As already discussed above, the wind deflector can be any generally cylindrically shaped structure such as a silo. When the wind deflector is constructed for use with wind powered electricity generating system 10, the wind deflector includes an interior deflector frame 25 surrounded by a cylindrical shell 24. The shell may be relatively lightweight because it does not bear any load beyond withstanding the force of the wind. For example, the wind deflector 20 may be molded as a single piece or multiple pieces of a lightweight material, such as, for example, plastic. Alternatively the frame may be formed as a separate component and the shell 24 may be a sheet of flexible impervious material such as nylon or canvas or an inflated double wall that is wrapped around the frame. Constructing the shell from sheet material makes the shell relatively simple and inexpensive to repair or replace. The shell 24 may be one or more rigid cylindrical sections that are assembled to the deflector frame. In some embodiments the wind deflector is between 30 and 60 feet in height and 10-40 feet in diameter. The wind deflector 20 includes a top spindle 28 fixed to the frame 25 on which the turbine mounting frame 40 is supported.

The turbine mounting frame includes a top cross member 41 and bottom cross member 45. The top cross member 41 is pivotally supported on the top spindle 28. As can also be seen in FIG. 5, the top spindle 28 provides a rotatable bearing surface on which the mounting frame 40 can be rotated. A bottom spindle 27 protrudes from the wind deflector 20 and through the bottom cross member 45. In this manner, the cross members 41, 45 are configured to be rotated with respect to the spindles 27, 28. This relative motion allows the cross members 41, 45 to be rotated to position the turbines 30 into the prevailing wind as will be described in more detail below with reference to FIGS. 3-5.

A drive shaft 35 is rotatably coupled at a first end to the top cross member 41 and at a second end to the bottom cross member 45. The drive shaft 35 is driven by the turbines to which it is connected. The drive shaft 35 is free to rotate within the cross members 41, 45 as it is driven by the turbines 30. The drive shaft is coupled to a generator 38 that is supported by the bottom cross member 45. The drive shaft spins the generator to generate electrical power. Wires 56 carrying electrical power generated by the generators are routed along a top surface of the bottom cross member through an exit connection 59 that routes the wires to exit the base of the turbine mounting frame 40.

Figure 6:
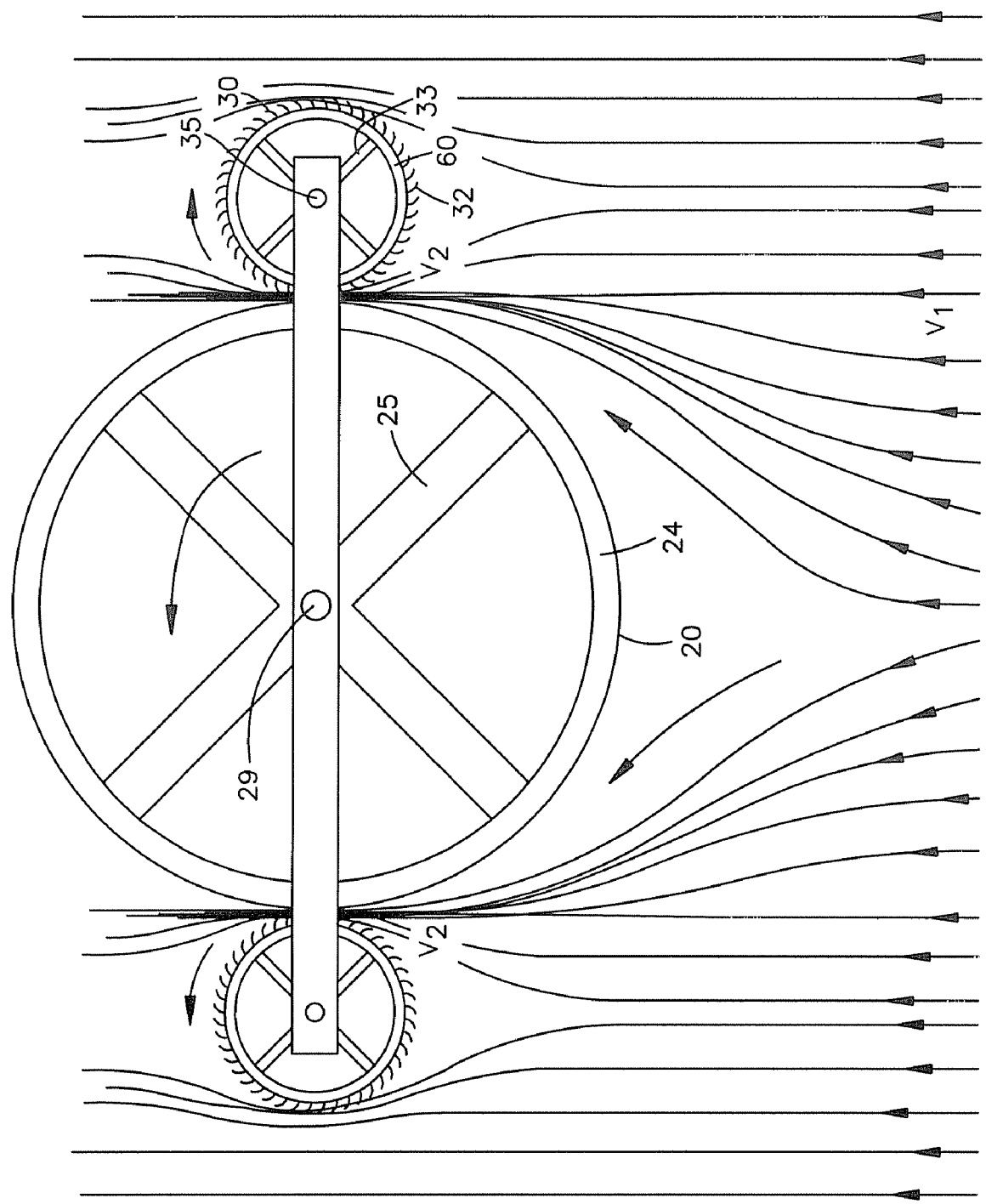
FIG. 6 is a top view of the wind powered electricity generating system of FIG. 1.
Figure 7:
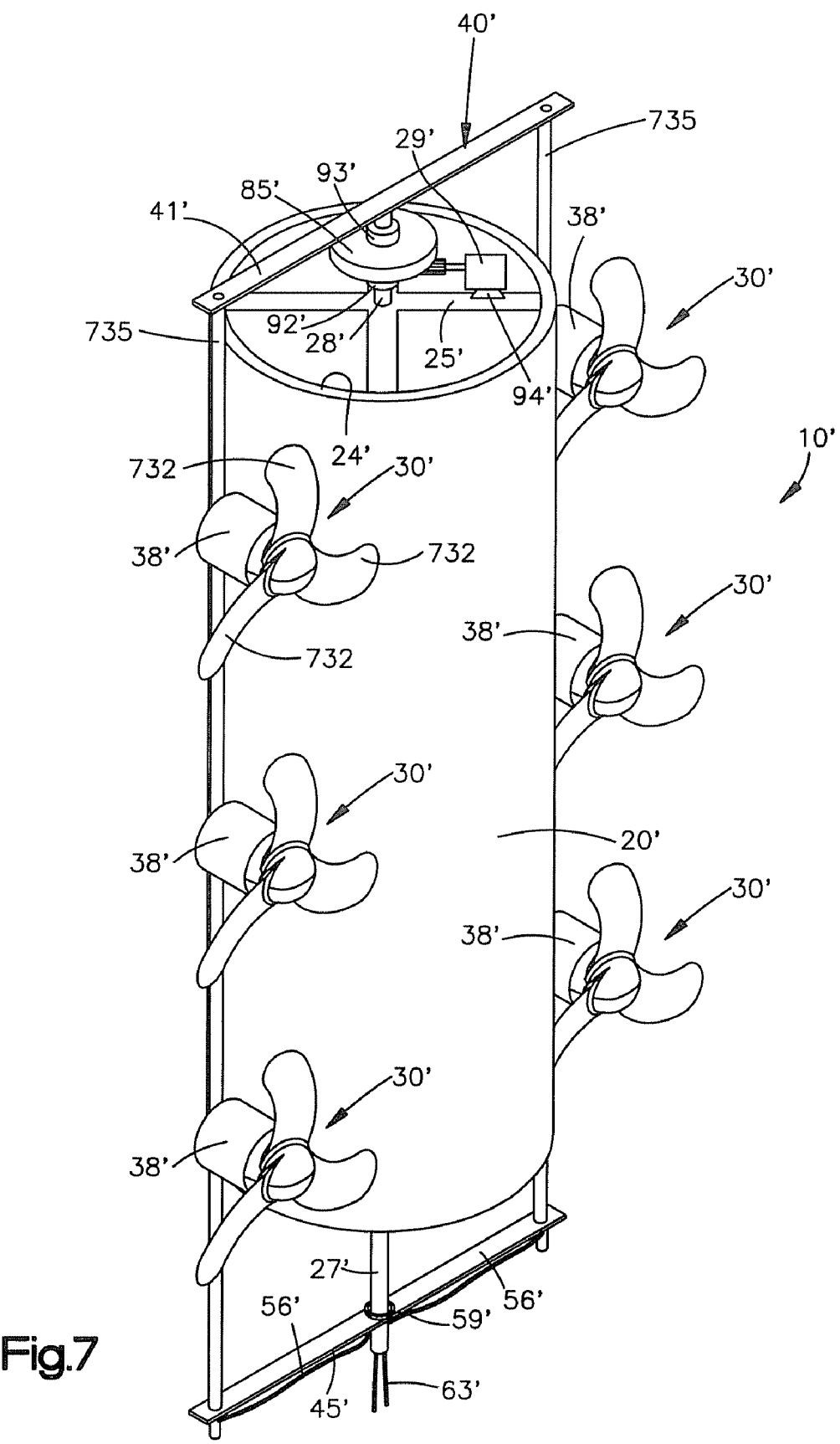
FIG. 7 is a front schematic view of a wind powered electricity generating system constructed in accordance with an alternative embodiment of the present invention.

As can also be seen in FIG. 6, the vertical axis turbine 30 is of a configuration commonly known as a "squirrel cage" and includes a plurality of vertical vanes 32 connected at each end to a pair of spaced ring plates 60. The ring plates 60 are connected to the drive shaft 35 with one or more internal turbine mounting arms 33. The vertical vanes are angled with respect to a central axis of the turbine to optimize the speed of rotation of the turbine. When wind impinges upon the vertical vanes, the turbine is rotated and that rotation is transferred to the drive shaft 35 by the mounting arms 33.

In simplified versions of the wind powered electricity generating system 10, the turbine mounting frame 40 is stationary with respect to the wind deflector 20. In this instance, the turbine mounting frame is oriented to position the turbines to face into the direction from which the wind most commonly blows.

Figure 3:
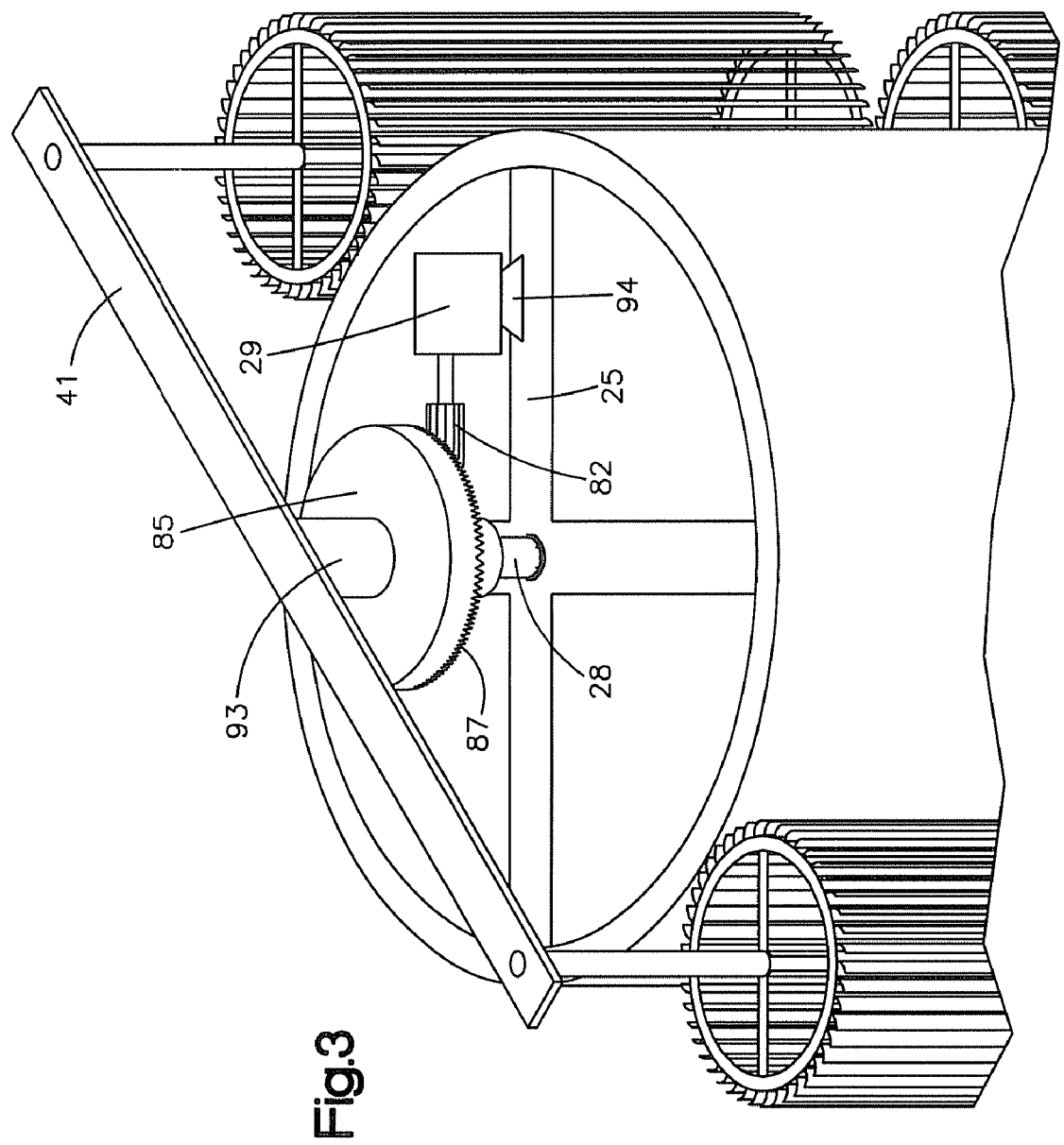
FIG. 3 is a fragmentary top view of the wind powered electricity generating system of FIG. 1.
Figure 5:
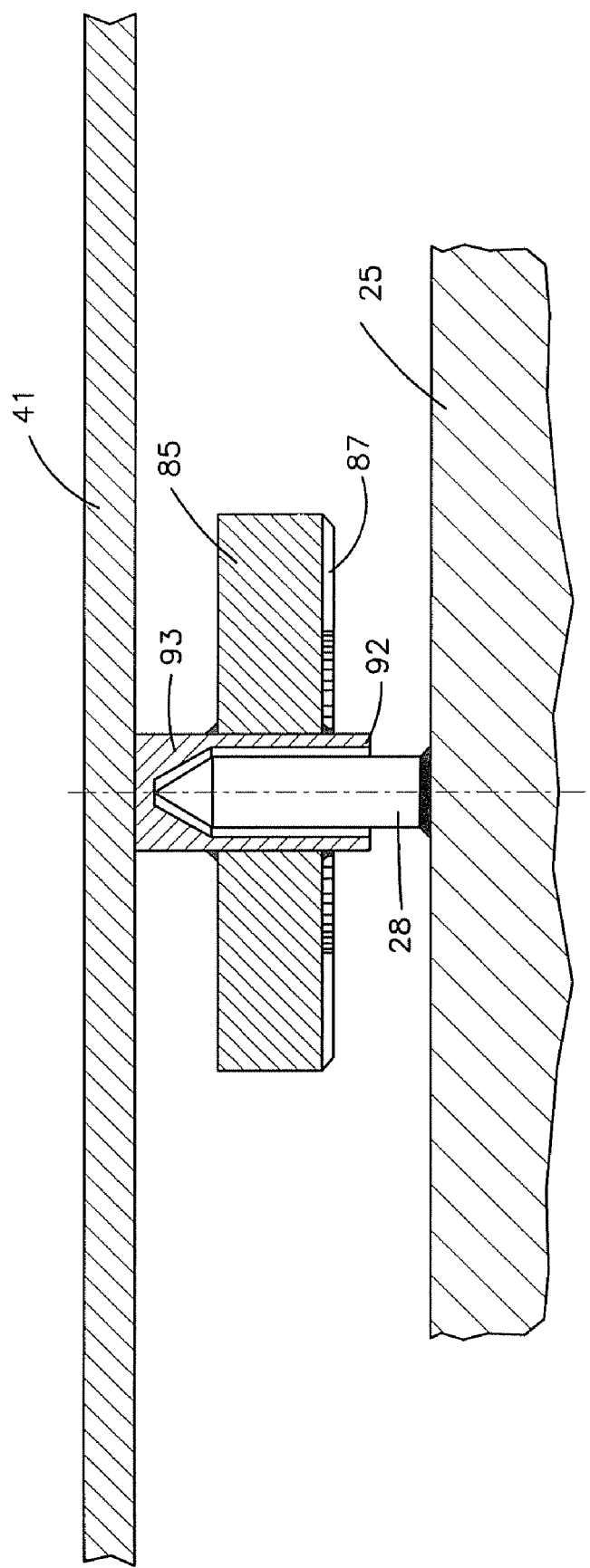
FIG. 5 is a schematic cross section view of the wind powered electricity generating system of FIG. 1.

Referring now to FIG. 3, to increase the operating range of the wind powered electricity generating system 10, the mounting frame 40 may be rotatable with respect to the wind deflector 20 to allow the turbines to be positioned to face into the prevailing wind. To this end, a rotator actuator shown schematically at reference numeral 29 is mounted to a mounting block 94 to the wind deflector. A drive member 93 is connected to the top cross member 41 and includes a face gear 85. The face gear has teeth 87 (FIGS. 3 and 5) that engage a pinion 82 on the rotator actuator. In this manner, the rotator actuator 29 is capable of driving the turbine mounting frame 40 in a rotary path about the spindles 27,28. To simplify implementation, the rotator actuator can be configured to rotate the frame in two directions around a path, with each path being limited to 180 degrees of travel. FIG. 5 illustrates a cross section of the spindle 28 supporting the drive member 93. Any suitable bearing configuration may be used to couple the drive member 93 to the spindle 28.

Figure 4:
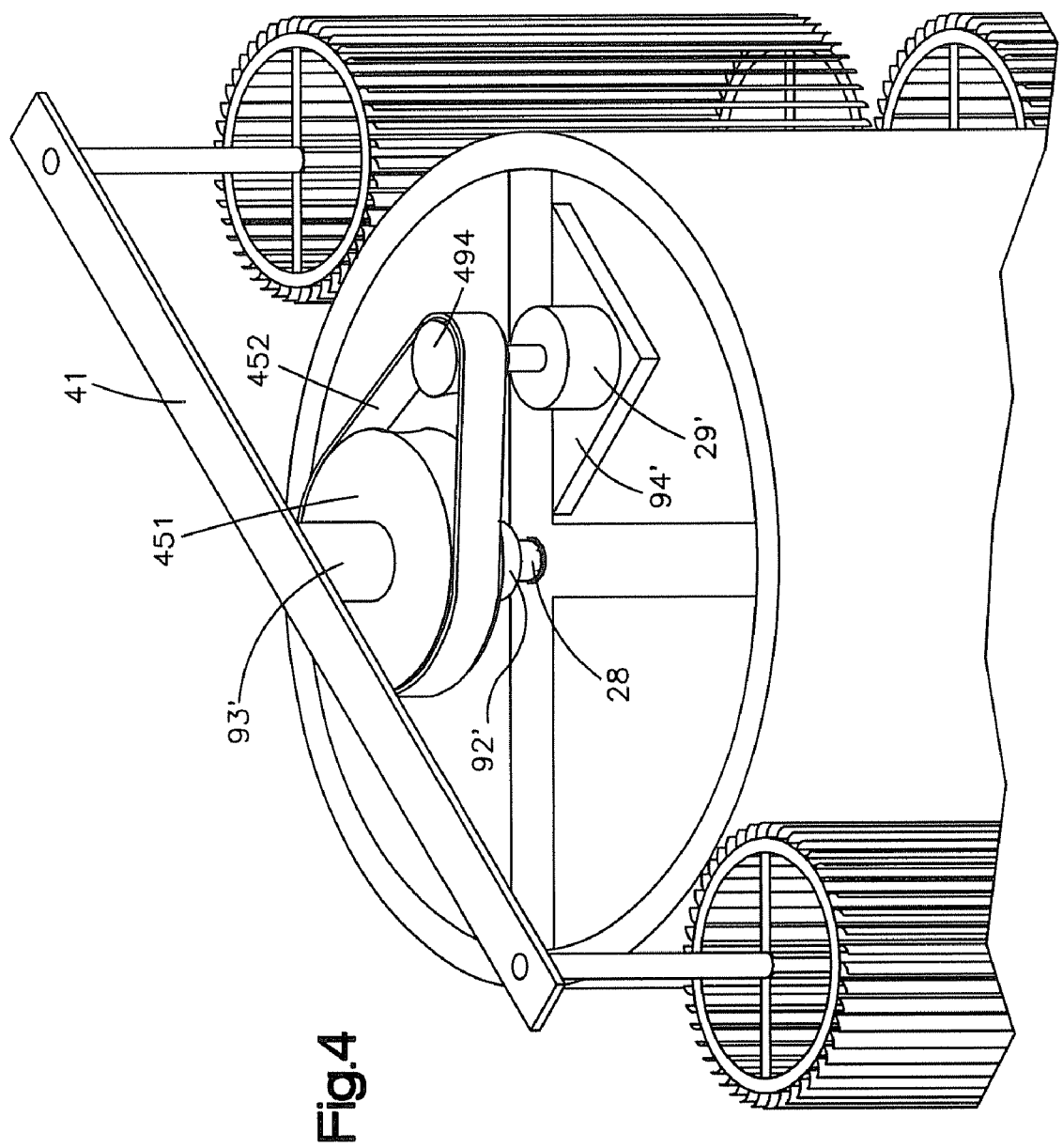
FIG. 4 is a is a fragmentary top view of a wind powered electricity generating system constructed in accordance with an embodiment of the present invention.

FIG. 4 shows an alternative system for rotating the frame. A drive member 93' has a pulley 451 mounted to it. A drive actuator 29' drives a second pulley 494 that is coupled to a belt 452. The belt 452 drives the pulley 451 to rotate the cross member 41. A portion of the generated electric power can be used to power the actuator. Of course, other actuator configurations and means of rotating the turbine mounting frame can be implemented within the scope of the present invention.

FIG. 6, which illustrates an exemplary wind flow velocity profile near the wind deflector 20, shows that the shape of the wind deflector amplifies or increases wind velocity flowing near the structure. Thus, wind flow approaches the wind deflector 20 at a velocity $v_1$ and then converges to flow between the wind deflector and turbine at a second velocity $v_2$. As the wind flows past wind deflector 20 in the area closest to the wind deflector, the velocity $v_2$, is greater than the velocity $v_1$. In this case velocity $v_2$ is approximately 1.5-1.9 times velocity $v_1$. Thus, the wind flow velocity near the wind deflector 20 has a velocity of up to approximately 1.5-1.9 $v_1$. Therefore, the vertical vanes of the turbines located in relatively close proximity to the wind deflector will be subject to higher wind velocities than if they were located outside of the accelerated flow path that surrounds the wind deflector.

FIG. 7 illustrates an alternative wind powered electricity generating system 10' that functions similar to the system described with reference to FIGS. 1-6 but that replaces the vertical axis turbines 30 of FIGS. 1-4 and 6 with horizontal axis turbines 30'. The horizontal axis turbines 30' include a number of blades 732 and each turbine 30' includes a dedicated generator 38' that is coupled to and driven by wind-induced rotation of the blades 732. The turbines 30' are mounted on a mounting frame 40' that is similar to the mounting frame 40 described above. The mounting frame is optionally rotated in two directions about a 180 degree rotational path by a rotator actuator 29' that drives a face gear 85' with a pinion 82' as described above with reference to FIG. 3. Of course, any rotational drive system that is capable of rotating the frame 40' to orient the turbines 30' to face the prevailing wind may be employed, including the pulley drive system shown in FIG. 4. The turbines 30' are mounted on a mounting shaft 735 that positions the turbine 30' near the cylindrical wind deflector 20 in the accelerated wind flow paths. Unlike the drive shaft 35 in FIGS. 1-6, the mounting shaft 735 is not rotationally driven by the turbines 30' but rather serves to position the turbines in the accelerated flow path and also to route electrical wires 56' that carry power from the dedicated generators 38' to a bottom cross member 59'.

By locating the turbines in proximity to the cylindrical wind deflector 20, the wind powered electricity generating system takes advantage of increased wind velocity. Since wind power conversion is cubically proportional to wind speed, a two fold increase in wind velocity results in an eight fold increase in power output. Thus, the incremental increase in wind velocity passing over the turbines results in a system that harnesses increased wind energy.

Although the present invention has been described with respect to specific embodiments, many modifications can be made without departing from the spirit and scope of the invention. All such modifications are intended to be included within the scope of the present invention, which is to be limited only by the following claims.

I claim:

1. An electrical power generating system adapted for use with a vertical wind deflector cylinder fixed to a ground surface that divides a flow path of wind impinging the structure into two separate accelerated wind flow paths around the cylinder, the cylinder having a solid outer surface, the system comprising:

a spindle configured to be mounted to a top surface of the cylinder;

a cross member configured to be supported on the spindle and to extend from a location on the top surface of the cylinder and terminate beyond an outer periphery of the cylinder;

a turbine mounting shaft suspended from the cross member at a first end distal from the spindle;

a turbine coupled to the turbine mounting shaft, wherein the turbine mounting shaft positions the turbine in proximity to a perimeter of the cylinder such that the turbine is driven by one of the two accelerated flow paths; and an energy converter coupled to the turbine that converts rotary motion from the turbine into electrical energy.

2. The electrical power generating system of claim 1 wherein the wind deflecting structure is comprises of a flexible shell wrapped around a substantially rigid frame.

3. The electrical power generating system of claim 2 wherein the flexible shell comprises canvas.

4. The electrical power generating system of claim 2 wherein the flexible shell comprises a double walled inflatable plastic shell.

5. The electrical power generating system of claim 1 wherein the turbine and wind deflecting structure are fixed in position relative to one another.

6. The electrical power generating system of claim 1 wherein the turbine is mounted to a moveable turbine frame and wherein the wind power generating system further comprises a frame control actuator that moves the turbine frame to position the turbine in an optimized wind flow path.

7. The electrical power generating system of claim 1 wherein the wind deflecting structure is mounted to a tower.

8. The electrical power generating system of claim 1 wherein the turbine comprises a vertical axis turbine having a vertical axis substantially parallel to a vertical axis of the cylinder.

9. The electrical power generating system of claim 8 wherein the turbine mounting shaft is rotatably suspended from the cross member and wherein the vertical axis turbine is configured to rotate the drive shaft when the vertical axis turbine is driven to rotate by impinging wind and wherein the drive shaft is drivingly coupled to the energy converter.

10. The electrical power generating system of claim 1 wherein the turbine comprises a horizontal axis turbine.

11. The electrical power generating system of claim 1 comprising:
a drive member rigidly coupled to the cross member, the cross member including a bearing surface configured to be rotatably supported on the spindle;
an actuator configured to be mounted to the top surface of the cylinder, the actuator configured to drivingly engage the drive member to produce relative rotary motion between the cross member and the cylinder to position the turbine into an optimized position with respect to the prevailing wind.

12. The electrical power generating system of claim 1 wherein the cross member is configured to extend along a diameter of the top surface of the cylinder to beyond the outer periphery of the cylinder on two sides of the cylinder, and comprising a turbine mounting shaft suspended from each of two distal ends of the cross member and a turbine coupled to each drive shaft.

* * * * *